UNITED STATES PATENT OFFICE.

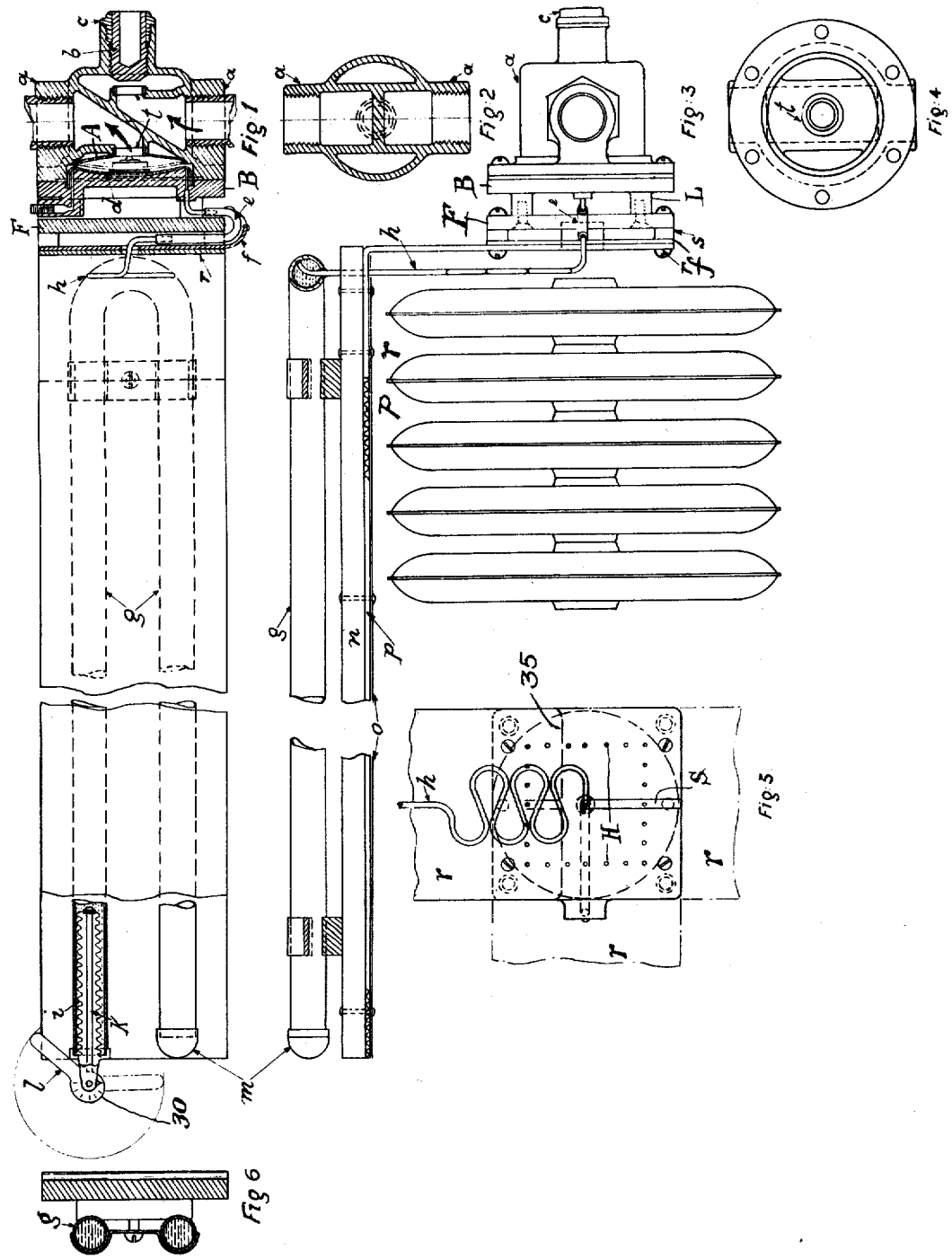

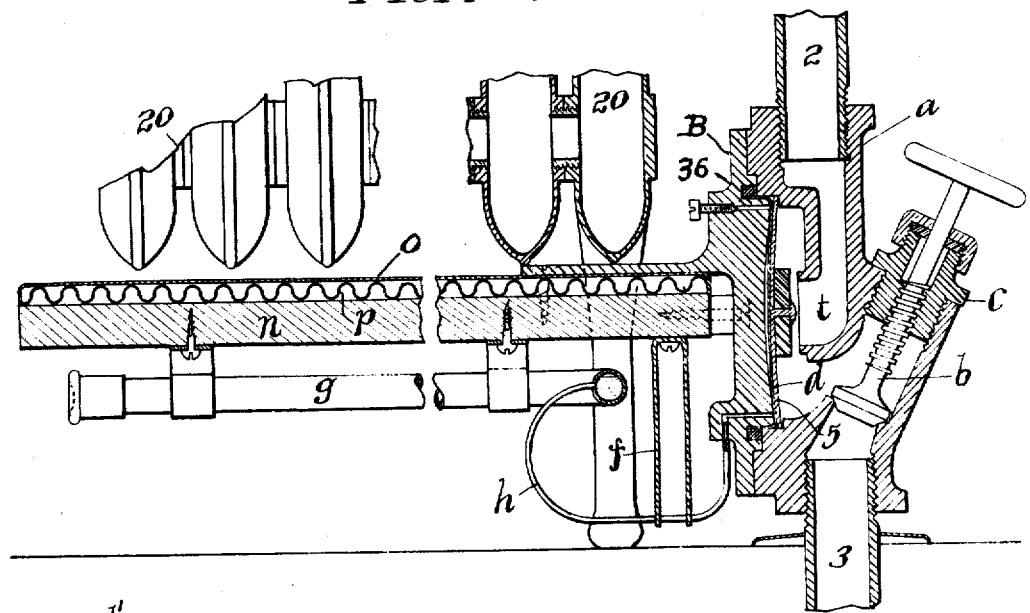
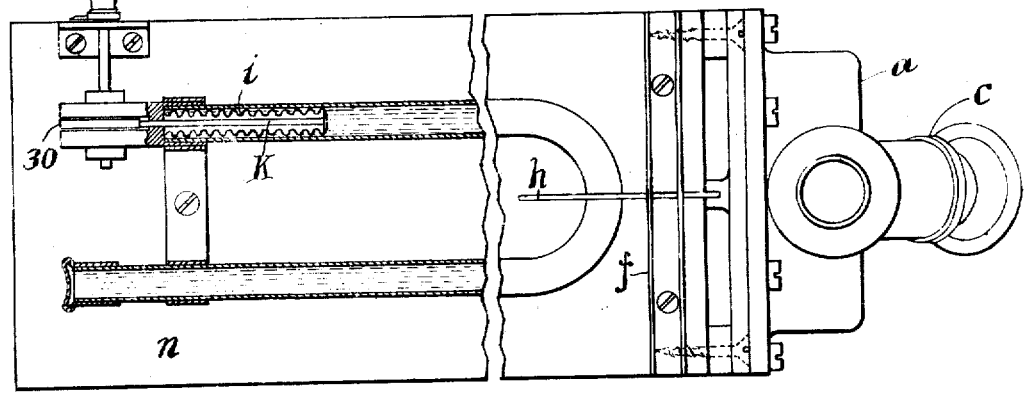
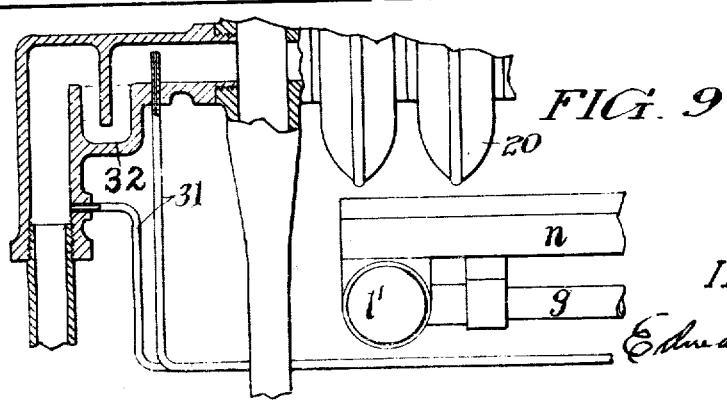

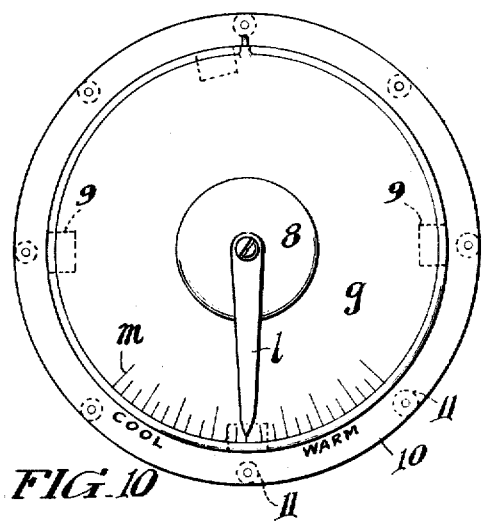
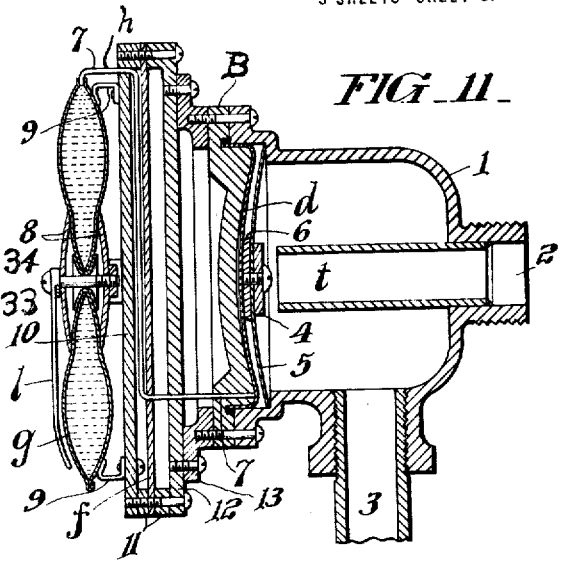

EDWARD S. HALSEY, OF YONKERS, NEW YORK.

INDIVIDUAL THERMOSTATIC CONTROL FOR RADIATORS.

1,312,113.  Specification of Letters Patent.  Patented Aug. 5, 1919.

Application filed August 29, 1916. Serial No. 117,394.

*To all whom it may concern:*

Be it known that I, EDWARD S. HALSEY, a citizen of the United States, and resident of Yonkers, in the county of Westchester and State of New York, have invented certain new and useful Improvements in Individual Thermostatic Controls for Radiators, set forth by the following specifications and claims.

The nature of my present invention is an atmospheric thermostat closely associated with or combined with a steam throttling valve for each individual radiator, so adapted and arranged that the thermostat may be located beside, beneath or back of the radiator and so protected from the radiant heat and hot air currents as to be practically uninfluenced by the direct heat of the radiator, being controlled almost wholly by air flowing to it at room temperature resultant from the natural circulation of the atmosphere of the room created by the rising air current at the radiator similar to that of the various devices described in my Patent No. 1,204,386, issued November 7th, 1916.

The objects of my invention are first to provide a means of installing the thermostat concealed behind the radiator where it will be perfectly protected from injury and so arranged that air at room temperature will be circulated up against its surface by induction from the heat of the radiator; second, to make a universal adaptation of a composite thermostatic supply valve which in addition to being fixed for projection back of the radiator, may be mechanically shifted or adjusted to adapt it to go beneath or on the other side of the radiator; third, to provide an adjustable off-setting bracket for the thermostat from the valve which may be adjusted for any standard width of radiator so as to reach back of it when the valve is installed in the usual position at the end of the radiator; fourth, to provide means for adapting expansive liquid thermostats or those operating upon the principle described and claimed in my application, Serial No. 81340, of March 1st, 1916, to be made in a composite thermostatic valve form to be carried by the radiator valve close to the radiator instead of at a distant point and to provide suitable heat shields and means of insulating the thermostat from the heated valve and connections; fifth, means of assuring an absolutely tight joint for the expansion chamber; sixth, provision of a dual ported combination hand and thermostatic valve body; and further objects are, general improvements in construction and operation as is set forth by the following specifications and claims.

In the accompanying drawings similar characters refer to similar parts throughout the several views in which Figure 1. is a side elevation of my preferred composite thermostatic supply valve with the valve portion in cross-section. Fig. 2. is an elevation in cross-section looking from the outer end of the valve. Fig. 3. is a top view looking down on said valve and connected thermostat and heat shield in position back of the radiator of which only a few sections are shown. Fig. 4. is an elevation of the opposite or inner end of the valve body with the cover and attached thermostatic equipment removed, exposing the open face of the valve which points to the radiator. Fig. 5. is an elevation of the overlying thermostatic supporting bracket and connecting tube, showing the valve cover or bonnet back of it as it would appear in looking at the valve from the standpoint of the radiator, while Fig. 6. is a cross-section through the thermostatic tube and insulating heat shield upon which it is mounted back of the radiator. Fig. 7. is a side elevation in cross-section of a modification of my composite valve which is adapted to go beneath the radiator. Fig. 8. is a bottom view at same looking upward, while Fig. 9. is a fractional view of the front of the radiator showing the return end of the radiator with a portion of the end of the thermostatic tube and heat shield beneath it; also showing in cross-section a special return fitting and heating pipe for the thermostat connected therewith. Fig. 10. is a front elevation of still another modification of my composite expansive liquid thermostatic valve and Fig. 11. is a side elevated cross-section through same. Fig. 12. is a front elevation of another modification from that of Fig. 10. Fig. 13. shows an adaptation of one of my volatile liquid thermostats, or motors, of the construction shown in my Patent Number 1,105,558 of July 28th, 1914, especially in Figs. 1. and 2., filled with a volatile liquid operating at room temperature, in this case being mounted in an insulating box or induction stack concealed back of the radiator and geared to a lever supply valve at the end of the radiator. Fig. 14. is a top view looking down on same showing a free air space around the thermostat where induced currents of air at room temperature may pass up through from the floor by induction of the rising currents of air from the radiator.

Referring to the type shown on Sheet 1, the valve is provided with two seats within the body, indicated by t—t—; the one at the right in Fig. 1 for the incoming steam is manually controlled by the lock shield valve, b, to close off the steam entirely as in warm weather or when it is desired to remove the bonnet with attached thermostatic portion, the other concentric port and seat being closed and controlled by the expansion of the diaphragm, d, against the valve disk which is carried by a spring spider between the diaphragm and seat, the operation of this device being equivalent to the thermostatic mechanism of my serial application, Number 81340 of 1916, above referred to and particularly shown in the second sheet of drawings thereof. The capillary tubes, h and e, connect the thermostatic U tube, g, with this expansion chamber so that upon a small expansion of the liquid in said thermostat tube a few drops are squeezed into said hot expansion chamber, closing the valve, and upon a contraction of said thermostatic liquid this expanded vapor is drawn back into the tube which is thermally connected with plate, f, at point, e, which keeps the tube cold so as to instantly condense the vapor back into its liquid form thus opening the valve. This cooling plate, f, is thermally insulated from the hot valve bonnet both as to conduction and radiation by the square fiber plate, F, to which it is mounted by four bushings, g, and clamping screws. This cooling plate is provided with a rectangular series of holes H universally spaced a short distance apart. Outside of this plate is superimposed another metal plate, r, which constitutes an angle bracket for adjustably supporting a wooden back board n, for carrying the thermostatic U tube back of the radiator. This is shielded from the heat of the radiator, first, by a bright sheet of tin, o, and secondly, by an intervening paper insulation, p, preferably in a corrugated form. This angle plate, r, is provided with a lateral slot, S, and two parallel rows of holes, one on either side thereof, which correspond and register with the underlying holes of plate, f. The slot is provided to straddle and slip back and forth over the capillary tube, h, where it comes out through the center of plate, f. In Figs. 3 and 5 the angle plate, r, is shown set in the most contracted position for the narrowest radiators, in which position the slotted end comes flush with one edge of the underlying plate, f, to which it is clamped by the four corner screws. Fig. 5 also indicates by dotted lines the other two positions in which this angle plate may be adjusted other than that shown by Fig. 3, one being to the right hand or just reversed from that of Fig. 3, to adapt it for left handed connected radiators and the third position being directed downward so as to bring the thermostat beneath the radiator. And the dotted line 35, is introduced to show the angle plate, f, and supported thermostat extended to its outermost position to care for the widest radiators.

To allow this outward movement of the thermostat position, a flexible junction is established between the thermostat and the valve expansion chamber by means of the snake formation of the connecting capillary tube, h, which is shown in its most contracted position.

A round disk strainer, A, of perforated metal having a central hole to fit over the outgoing valve port is provided to fit closely into the large opening in the face of the valve. This is so arranged that all the inflowing steam after passing into the main valve cavity through the hand controlled admission port and encircling the central cored portion has to pass out through said strainer before it can reach and pass out by the thermostatically controlled port to the radiator connection. While this connection into the radiator is not shown on this sheet, it may be made either to the top of the radiator or to the bottom, preferably the former.

To one of the extremities of the thermostatic U tube is attached, as shown in Fig. 1, a cam temperature adjusting device, 30, being actuated by the lever, l. This cam presses against the push rod, K, which displaces the liquid contents of the thermostat tube by the expansion of the metal bellows, i, so that as the lever and cam are progressively advanced the liquid is forced into the expansion chamber, closing the valve at a proportionately lower temperature, as may be indicated by an index upon the face of the cam so that a higher or lower temperature of operation may be secured at will by simply rocking the cam.

Referring to Sheet 2, a similar composite thermostatic supply valve is shown which is adapted to be projected beneath the radiator only. In this design the hand valve which is embodied in the thermostatic valve is brought in at an angle so that the permanently attached hand wheel does not project objectionably out into the room. In this modification twin cooling plates, f, are provided for the capillary connection between the valve and the thermostat and the temperature adjusting cam, 30, is equipped with a knurled handle instead of a lever. In Fig. 9 an auxiliary heating device is provided for actuating the thermostat in the way of a small pipe loop, 31, with its two terminals connecting to a return, water trapped, fitting, 32, for the drainage of the radiator. It will be noted that the upper end of this loop is introduced so as to be always above the water line, and the other end leading back into the fitting below the water trap so that all the liquid drainage from the radiator will pass out through the water trap and all the air or following steam will pass through the pipe loop which is placed directly beneath the thermostat tube, $g$, and as there is little or no heating effect from the slowly escaping air the thermostat tube above it is not appreciably affected until the air is expelled and steam commences to pass out through the loop, 31, whereupon the thermostat is immediately influenced to close the steam supply to the radiator allowing the small pipe, 31, to cool which it does quickly on account of its small mass, this operation being an auxiliary function to that of the room temperature controlled by the thermostat dispensing with the obstruction of a steam trap on the return end of the radiator, at the same time preventing live steam from passing into the return pipes.

I have experienced great difficulty in making a vapor tight joint for my expansion chamber at the junction of the diaphragm with the valve bonnet which constitutes the outside of the expansion chamber, as the working pressures and temperatures are very high and the contained vapors are of a very penetrating character and the most minute leak will manifest itself in the way of an error of regulation in a short time, so that the slightest flaw in the soldering which would not be detectable by other means or under ordinary usage is fatal to this device. To overcome this difficulty I have experimented and determined that by turning a deep annular groove, 31, in the bonnet casting for the rim of the diaphragm, $d$, and tinning the inside and the outside of the diaphragm rim before introducing it into said groove which is provided considerably wider than the thickness of said rim, by holding the bonnet horizontally with the diaphragm uppermost over a gas flame and by puddling the molten solder in the groove outside of the diaphragm rim by means of a wire dipped in flux, it is possible to positively eliminate any blemish or imperfection of the solder seal at this point by means of said puddling.

Referring to the modifications shown on the third sheet, Figs. 10 and 11, show a composite thermostatic valve employing a pancake liquid-filled thermostat, $g$, which is constructed of two dished metal plates sealed about the periphery and also indented and pierced at the center leaving a small hole for an adjusting screw, 33, and this hole through the two plates is sealed by a brass eyelet, 34, fitting it snugly and being spun over and soldered on both sides thereof. This adjusting screw operates by squeezing together the two stiff center plates, 8, the inner one of which acts as a nut. Fixed to the head of the screw is an adjusting lever and indicator, $l$, the point of which registers on the temperature scale, $m$. As the lever is turned and the screw tightened a portion of the liquid is squeezed forward through the capillary tube, 7, to the diaphragm expansion chamber so as to close the valve at a relatively lower temperature with the reverse effect when the lever is moved in the opposite direction.

Fig. 12, shows a liquid thermostat in the form of a Bourdon tube, $g$, which may be substituted for the pan-cake form of liquid thermostat shown in Figs. 10 and 11. This elastic tube is mounted on the face of the heat shield, 10, by means of the lug, 19, which leaves its two extremities free so that they may be flexed to alter the liquid contents and consequent adjustment of the temperature of operation in the same manner as the type shown in the above figure.

Said adjustable flexing of this Bourdon tube is secured by means of a toggle joint constituted by the two lever arms, 15 and 15, pivoting on the nut, 16, which is raised and lowered by means of the adjusting screw, 17, anchored in the angle bracket, 18, so that a tightening up of said screw contracts said tube throughout in a uniform progressive manner which may be registered in any convenient manner.

The heat shield for these modifications is more particularly shown in Fig. 11, and consists of two disks of insulating material 10 and 12, spaced from each other by an encircling series of bushings, 11, of insulating material with an intervening metal reflecting plate, $f$, which also acts as the cooling surface for the condensing tube, 7, which communicates with the hot vaporizing expansion chamber integral with the valve bonnet. This cooling plate is preferably made of copper with a polished tin face facing toward the valve or hot side to help intercept radiant heat and dissipate same by virtue of its high conductivity and large exposed surface to the upward circulating air currents between the heat shields. At the point where the tube, 7, pierces this cooling disk it is preferably soldered to it to secure high conduction for the heat to be dissipated.

Referring to Figs. 13 and 14, the heat shield of the induction stack, 23, is of equivalent construction to that of Figs. 1 and 3, having first, a sheet of bright tin as a reflector against the radiator, next, a course of corrugated paper, preferably with the corrugations set in a vertical position to enhance the dissipation of heat by cooling, currents of air rising through it, thus preventing its transfer through the shield. And lastly, this is backed up by a layer of wood to act partly as insulation and as a supporting frame for the device.

I believe I am the first to suggest and use a thermostat for radiator control concealed, protected or incased in a vertical induction stack behind or closely associated with the radiator for controlling the temperature of the same so located and applied that air at practically room temperature is drawn up through said induction stack past said thermostat in a mildly forced draft by the induction of the large volume of heated air circulated by the radiator in its regular function of heating the room.

While I have only attempted to show one or more means of carrying out the various features of my invention it is obvious that many other means and modifications will arise in the minds of those skilled in the art of executing same.

I claim:—

1. In a composite thermostatic room temperature regulating steam supply valve a valve body; a detachable bonnet therefor; a cool expansive liquid filled bulb constituting an atmospheric thermostat fixed to and carried by said bonnet through heat insulating means; a throttle within said valve; a flexible throttle actuating expansion chamber connecting with said throttle; and a small heat insulating tube communicating the actuating pressure from said cool bulb to said expansion chamber.

2. In a composite thermostatic room temperature regulating radiator valve a valve body connected to a radiator and supply pipe; a detachable bonnet to said body; a tubular atmospheric thermostat bulb adapted to project horizontally beneath or back of said radiator from said bonnet to which it is rigidly fixed and supported by thermal insulating means; a port closing disk within said valve actuated by an expansion chamber inside of said bonnet; an expansive liquid filling said bulb; an intercommunicating pressure tube between said bulb and said expansion chamber; and a suitable radiant heat shield interposed between said bulb and said radiator.

3. A temperature regulator adapted to a radiator closely spaced from and parallel with the wall of a room comprising a thin atmospheric thermostat adapted to be fixed freely spaced between said radiator and wall; a vertically imposed radiant heat shield adapted to stand between said thermostat and radiator having its bottom edge on an approximate level with the bottom of said radiator so formed and spaced as to cut off the radiant heat from said thermostat and facilitate an upward induction of floor air of approximate room temperature past said thermostat; a suitable automatic throttle valve to said radiator; and a working connection between said thermostat and valve.

4. In a composite room temperature regulating thermostatic supply valve, a valve body with a detachable bonnet adapted to face the radiator; a long thin heat insulating shield adapted to be projected horizontally from said bonnet either beneath or to one side of said radiator; an off-setting bracket supporting said shield from said bonnet; a thin elongated atmospheric thermostat fixed parallel to the sheltered side of said shield and a suitable throttle within said valve in working engagement with said thermostat.

5. In an adjustable composite thermostatic radiator valve a valve body with a detachable bonnet adapted to face the radiator; an angle bracket with one arm adjustably attached across the face of said bonnet so that its other arm may be set at various distances off to one side to adapt it to various width of radiators; a horizontally projected heat shield fixed to and movable with said off-set arm; a liquid filled thermostat bulb fixed to the outer side of said heat shield; a fluid pressure actuated throttle within said valve and a flexible tubular connection between said movable bulb and said throttle actuating means.

6. In an integral hand and thermostatic temperature regulating valve a bonnet member; a valve body casting therefor having separate and distinct inlet and outlet ports therein, concentric with each other and with said body, one of said ports concentrically facing said bonnet and the other said port located back of the first and facing in the opposite direction; a thermostatically actuated closing disk for the first said port working between it and said bonnet; and a concentric manually operated valve disk and stem introduced at the back of said valve body so as to close against said second port.

7. In a temperature regulating valve mechanism, actuated by the alternate automatic injection and withdrawal of a minute portion of volatilizing and re-condensing liquid to and from a hot vaporizing diaphragm expansion chamber; a wide, open sided, valve body; a solid bonnet plate adapted as the closure for said open side making contact with said body by an overhanging flange; a narrow annular groove cut into the inner face of said plate of a slightly smaller diameter than the mouth of said open side; a dished spring diaphragm plate formed up with a back turned rim from a thin sheet of metal, said rim being fitted and sweated into said groove so as to create said chamber; and a pressure duct for said liquid feeding through said solid plate into said chamber for the purpose specified.

8. In a composite room temperature regulating, thermostatic supply valve, a valve body with a detachable bonnet adapted to face the radiator; a long thin heat insulating shield adapted to be projected horizontally from said bonnet beneath said radiator; a thin elongated atmospheric thermostat fixed parallel to the under sheltered side of said shield; supporting brackets for said thermostat and shield adapted to support them in a fixed position beneath the radiator from said bonnet; and a working connection between said thermostat and said valve.

9. In a temperature regulating valve mechanism actuated by the alternate automatic injection and withdrawal of a minute portion of volatilizing and re-condensing fluid to and from a hot vaporizing diaphragm expansion chamber, a wide open-sided valve body; a solid bonnet plate adapted as the closure for said open side, making contact with said body by an overhanging flange; a raised concentric boss on the inner face of said plate of slightly less diameter than said body opening and adapted to project into same; an annular groove cut into the inner face of said plate closely encircling said boss at its juncture with said contact flange; a dished spring diaphragm plate formed up with a deep back turned rim from a thin sheet of metal, said rim being closely fitted back over said boss and sweated into said groove so as to create said chamber; and a pressure duct for said fluid feeding through said solid plate into said chamber for the purpose specified.

10. In a temperature regulating valve actuated by the automatic alternate injection and withdrawal of a minute quantity of volatile fluid to and from a normally dry hot vaporizing expansion chamber, an air cooled plate spaced from and rigidily fixed to said valve by thermally insulating means; and a capillary tube conducting said vaporizing fluid to and from said hot chamber within said valve; said tube making thermal connection to said cooling plate a short distance from said bonnet.

11. In a temperature regulating valve, a body and a bonnet therefor; a concentric outlet port seat within said valve facing the bonnet; a port closing disk working between said bonnet and seat; a diaphragm dirt strainer concentrically encircling and tightly fitting around said seat parallel with said bonnet partitioning the main valve cavity with said disk and port seat on the outer side thereof and an incoming port to said cavity on the inner side of said screen partition so that the incoming steam will pass out through said strainer before it can reach said outgoing concentric port.

Having described my invention I hereunto set my hand in the presence of two witnesses.

EDWARD S. HALSEY.

Witnesses:
 W. HAY,
 S. C. HALSEY.